Aug. 11, 1970 M. CRADDOCK 3,524,109
TIME DELAY RELAY
Filed Jan. 29, 1968
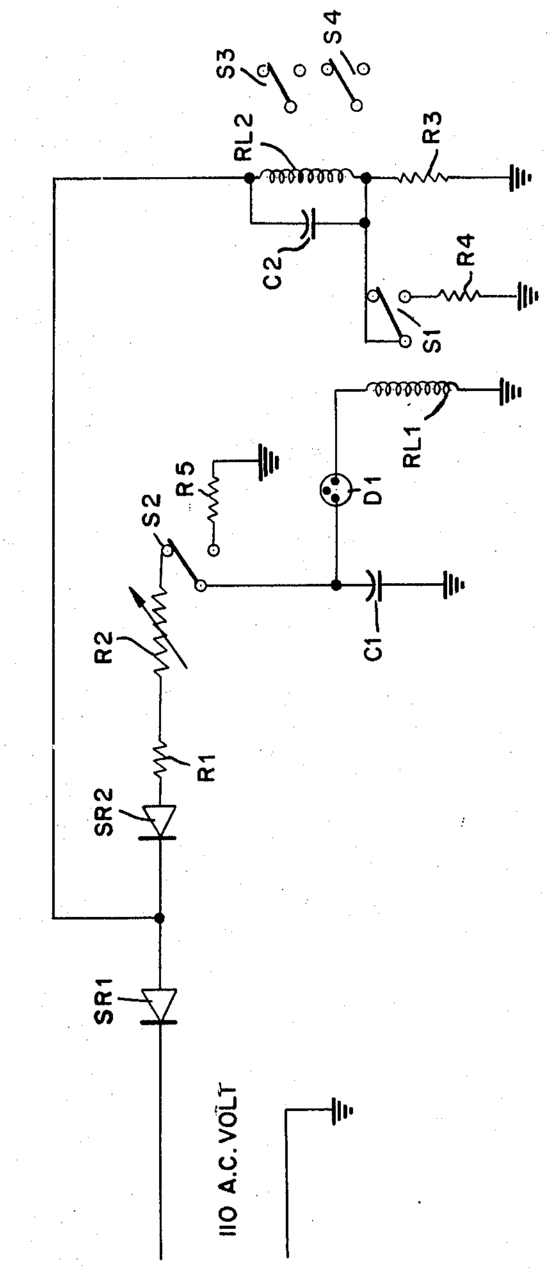
*INVENTOR.*
MIKE CRADDOCK

United States Patent Office 3,524,109
Patented Aug. 11, 1970

3,524,109

TIME DELAY RELAY

Mike Craddock, P.O. Box 1068,
Big Spring, Tex. 79720

Filed Jan. 29, 1968, Ser. No. 701,232
Int. Cl. H01h *47/18*
U.S. Cl. 317—141 1 Claim

ABSTRACT OF THE DISCLOSURE

This invention relates to a time delay relay wherein the timing portion of the circuit consists of a silicon diode providing direct current to charge a capacitor, slowly, through a resistance. Once the charge has built up on the capacitor, it is discharged through a gas diode to a small sensitive relay coil which operates its contacts to close an electrically latched 3PDT power relay.

This invention relates to an improved circuit for an electronic time delay relay. This time delay relay is the type that operates a set of relay contacts at the end of a delayed period after application of the electrical energy.

There have been many electronic time delays marketed, but they generally have a number of undesirable characteristics in common. This invention overcomes many of them.

This time delay circuit readily permits time ranges from one second to as long as one hour. Few economical electronic time delay circuits lend themselves to timing ranges longer than 5 minutes.

This time delay circuit is easily made a variable delay through the use of a variable resistor.

Another important advantage is that it is only slightly affected by temperature changes.

The particular arrangement described herein permits the use of a plug-in type relay which permits easy field replacement of the only mechanical part, and the load carrying contacts.

The inherent simplicity of this circuit provides a natural dependability of operation and economy of construction. The timing portion of the circuit consists of a silicon diode providing direct current to charge a capacitor, slowly, through a resistance. Once the charge has built up on the capacitor, it is discharged through a gas diode to a small sensitive relay coil which operates its contacts to close an electrically latched 3PDT power relay.

The operation of the circuit may best be understood by referring to the enclosed drawing. The circuit is drawn with all switch blades in the normally de-energized position, as they are while the circuit is timing.

Once 110 AC voltage is applied at the input on the left side of the drawing, current immediately begins to flow through the series circuit consisting of the diode SR1, the relay RL2, and the resistor R3. The capacitor C2 parallel to RL2 serves only to filter the half cycle pulses from the diode SR1. RL2 does not close immediately however, because the voltage drop across SR1 and R3 limits the voltage drop across RL2 to a value below pull-in value.

Also, immediately on application of voltage, current begins to flow through the first diode SR1, the second diode SR2, the resistance R1, the variable resistance R2, and the switch blade S2, to begin to charge the capacitor C1. Although the gas diode D1 is connected to the capacitor, only a negligible current flows through it because at the onset, the voltage across it is well below ionization potential. A period of time must transpire before the limited current passing through variable resistor R2 will be able to fully charge the capacitor C1. When the charge on the capacitor C1 builds up sufficiently, the voltage difference on capacitor C1 being exerted across the gas diode D1 will cause the gas diode D1 to ionize, discharging the capacitor charge C1 through the sensitive relay coil RL1. When the current surges through the coil of RL1, the switch blade S1 moves to connect resistor R4 to the coil of RL2, and in parallel with R3. Being in parallel with R3 and in series with RL2, the resistor R4 passes enough additional current through the power relay coil RL2 to cause the relay to pull-in. The charge on capacitor is rapidly depleted by the gas diode and relay coil circuit, causing the relay RL1 to fall out. When the relay RL1 falls out, the power relay remains pulled in because the voltage drop across it caused by the series circuit SR1, RL2 and R3, is not below its fall out value. Capacitor C1 is further discharged through switch blade S2 which is now connected to R5, and disconnected from the charging potential from R2. The time delay has now timed out and has operated its power relay, and the operated contacts S4 and S3 are in their closed position. The timing capacitor has been discharged by resistor R5, "resetting" the timing portion of the circuit. The power relay RL2 will remain closed, and the timing circuit will remain discharged until 110 AC power is disconnected from the input terminals sufficiently long to permit the mechanical movement of the arm of the power relay RL2 to move to the deenergized position, completing a time cycle. It is important to note that the timing circuit was discharged (re-setting the timing circuit) before power was disconnected. This feature provides a very rapid re-cycle without affecting the normal length of the time out.

Although a preferred embodiment of the invention has been described in detail, it is to be understood that various changes, substitutions, and alterations can be made therein without departing from the spirit and scope of the invention as defined by the appended claim.

What is claimed is:

1. In a circuit for a time delay relay the combination of: a first relay having a set of normally open contacts, a second relay having a plurality of sets of double throw contacts, a series DC circuit including the second relay constantly energized so as to always provide a current less than its pull in value but above its fallout value through the second relay and a timing circuit to establish the pull in condition in the second relay consisting of a source of direct current including a silicon diode, a variable resistance to vary the magnitude of the direct current therethrough, a charging capacitor to receive and hold the electrons passing through the diode and the variable resistance, a gas diode connected to the capacitor and to the first relay to operate its set of contacts to their closed position only when the capacitor charging voltage reaches the breakdown voltage of the diode and the diode discharges the capacitor current through the first relay, a resistance connected in the series DC circuit only when the contacts of the first relay are closed to cause the current to increase above its pull in value through the second relay as long as this resistance is in the circuit to cause the plurality of sets of double throw contacts to assume and continue their actuated conditions as long as the series DC circuit remains energized even though the resistance is disconnected from the circuit upon deenergization of the first relay and a discharge resistor connected only in parallel with the capacitor through one of the sets of the actuated contacts.

References Cited

UNITED STATES PATENTS

| | | | |
|---|---|---|---|
| 2,040,425 | 5/1936 | Biach | 317—142 XR |
| 2,347,714 | 5/1944 | Sorensen | 317—141 XR |
| 2,433,254 | 12/1947 | Aiken | 317—142 |
| 3,206,650 | 9/1965 | Miller et al. | 317—142 |
| 3,445,741 | 5/1969 | Gerber | 310—49 XR |

FOREIGN PATENTS

| | | |
|---|---|---|
| 104,800 | 8/1938 | Australia. |

J D MILLER, Primary Examiner

C. L. YATES, Assistant Examiner